(12) United States Patent
Song et al.

(10) Patent No.: US 9,984,435 B2
(45) Date of Patent: May 29, 2018

(54) DIGITAL IMAGE PROCESSING METHOD, NON-TRANSITORY COMPUTER-READABLE RECORDING MEDIUM HAVING RECORDED THEREON A PROGRAM FOR EXECUTING THE DIGITAL IMAGE PROCESSING METHOD, AND DIGITAL IMAGE PROCESSING APPARATUS

(71) Applicant: Samsung Electronics Co., Ltd., Gyeonggi-do (KR)

(72) Inventors: Won-seok Song, Seoul (KR); Tae-hoon Kang, Gyeonggi-do (KR); Myung-kyu Choi, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 31 days.

(21) Appl. No.: 14/842,116

(22) Filed: Sep. 1, 2015

(65) Prior Publication Data

US 2016/0070978 A1    Mar. 10, 2016

(30) Foreign Application Priority Data

Sep. 5, 2014    (KR) .................. 10-2014-0119363

(51) Int. Cl.
*H04N 5/228*    (2006.01)
*G06T 3/00*    (2006.01)
(Continued)

(52) U.S. Cl.
CPC .............. *G06T 3/00* (2013.01); *G06K 9/2081* (2013.01); *G06K 9/3233* (2013.01);
(Continued)

(58) Field of Classification Search
CPC ........... H04N 21/4223; H04N 1/00458; H04N 1/00461; G06F 3/0484; G06F 3/04842
(Continued)

(56) References Cited

U.S. PATENT DOCUMENTS 5,528,194 A    6/1996    Ohtani et al.
7,129,974 B2    10/2006    Morichika
(Continued)

FOREIGN PATENT DOCUMENTS

JP    2005-115711 A    4/2005
JP    4169462 B2    8/2008
(Continued)

*Primary Examiner* — Kelly L Jerabek
(74) *Attorney, Agent, or Firm* — Cha & Reiter, LLC

(57) ABSTRACT

A digital image processing method and apparatus eliminates or reduces the temporal delay associated a perspective transform being generated for a region of an captured image. The method includes: receiving a preview image; detecting at least one rectangular region from the preview image and obtaining coordinate information corresponding to the at least one rectangular region; determining a main rectangular region from among the at least one rectangular region detected from the preview image; capturing an image; and generating a perspective-transformed image by performing perspective transform on the captured image by using coordinate information corresponding to the main rectangular region.

17 Claims, 14 Drawing Sheets

(51) Int. Cl.
  *H04N 5/232*   (2006.01)
  *H04N 5/262*   (2006.01)
  *G06K 9/20*    (2006.01)
  *G06K 9/32*    (2006.01)
  *G06K 9/36*    (2006.01)

(52) U.S. Cl.
  CPC ..... *H04N 5/23216* (2013.01); *H04N 5/23229* (2013.01); *H04N 5/2621* (2013.01); *H04N 5/2628* (2013.01); *G06K 2009/363* (2013.01)

(58) Field of Classification Search
  USPC .............. 348/207.1, 222.11, 333.11, 333.12; 382/282
  See application file for complete search history.

(56) References Cited

U.S. PATENT DOCUMENTS

| | | | |
|---|---|---|---|
| 7,268,803 B1 | 9/2007 | Murata et al. | |
| 7,366,359 B1* | 4/2008 | Davey | G06K 9/00771 346/143 |
| 7,486,310 B2 | 2/2009 | Sakurai et al. | |
| 7,619,663 B2 | 11/2009 | Sakurai et al. | |
| 7,777,785 B2 | 8/2010 | Akasawa | |
| 8,009,929 B2 | 8/2011 | Sakurai | |
| 8,587,818 B2 | 11/2013 | Imaizumi et al. | |
| 2005/0078192 A1 | 4/2005 | Sakurai et al. | |
| 2010/0020221 A1* | 1/2010 | Tupman | G06F 3/04883 348/333.01 |
| 2011/0069180 A1* | 3/2011 | Nijemcevic | G06K 9/3216 348/207.1 |
| 2011/0273575 A1* | 11/2011 | Lee | G01C 21/20 348/222.1 |
| 2013/0094764 A1 | 4/2013 | Campbell | |
| 2013/0235224 A1* | 9/2013 | Park | H04N 5/23222 348/218.1 |
| 2013/0342723 A1* | 12/2013 | Ishii | H04N 5/232 348/222.1 |
| 2016/0028945 A1* | 1/2016 | Kraft | G06T 15/08 348/207.1 |

FOREIGN PATENT DOCUMENTS

| | | |
|---|---|---|
| JP | 4363151 B2 | 8/2009 |
| JP | 4662874 B2 | 1/2011 |
| JP | 2013-89234 A | 5/2013 |

* cited by examiner

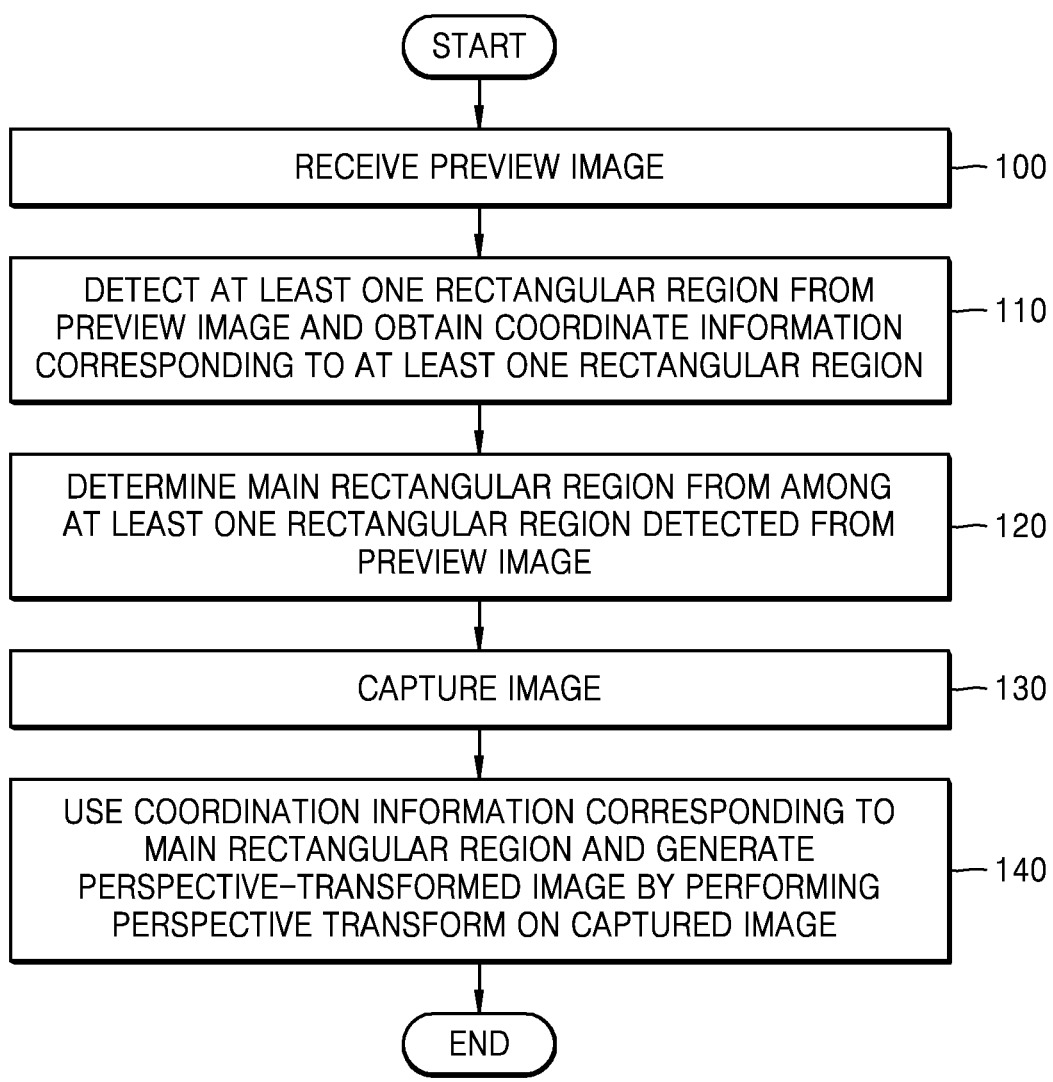

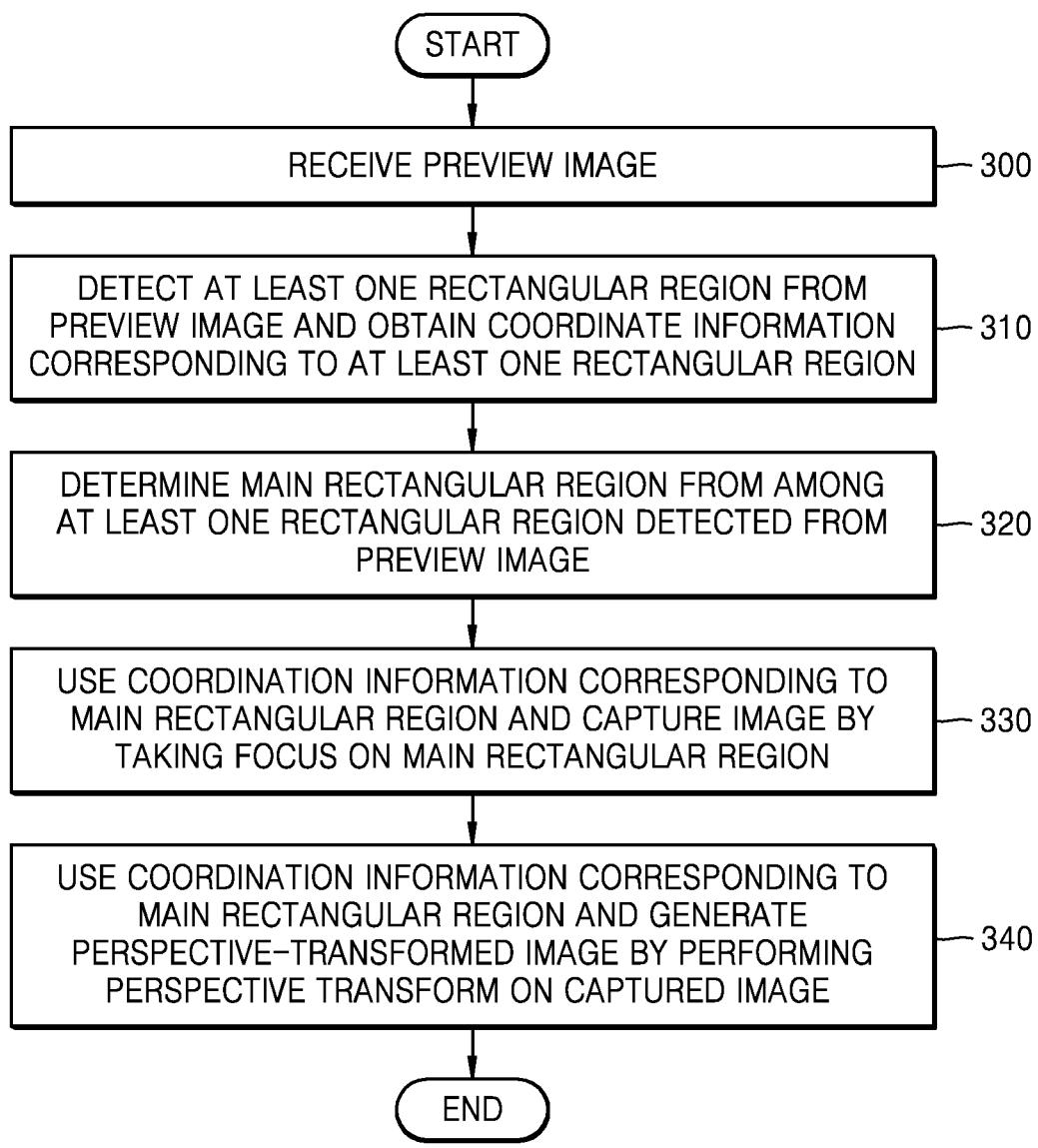

DIGITAL IMAGE PROCESSING METHOD, NON-TRANSITORY COMPUTER-READABLE RECORDING MEDIUM HAVING RECORDED THEREON A PROGRAM FOR EXECUTING THE DIGITAL IMAGE PROCESSING METHOD, AND DIGITAL IMAGE PROCESSING APPARATUS

CLAIM OF PRIORITY

This application claims the benefit of priority from Korean Patent Application No. 10-2014-0119363, filed on Sep. 5, 2014, in the Korean Intellectual Property Office, the disclosure of which is incorporated herein in its entirety by reference in its entirety.

BACKGROUND

1. Field of the Disclosure

One or more embodiments of this disclosure relate to a digital image processing method, apparatus and a non-transitory computer-readable recording medium having recorded thereon a program for executing the digital image processing method of detecting a rectangular region from a preview image in advance to generate a perspective transform.

2. Description of the Related Art

A perspective transformation (i.e. perspective transform) is generally defined as s a collineation set up in a plane by projecting on the points of another plane from two different centers of projection. In order to perform a perspective transform on an image, a general digital image processing apparatus needs to detect a rectangular region from a captured image and generate a perspective-transformed image by performing a perspective transform based on the detected rectangular region. There is a wide range of use for perspective transformations, and in the field of healthcare, the ability to manipulate the view of an image to a different perspective can be very valuable in the diagnosis and treatment of patients.

Therefore, when a user wants to perform a perspective transform on a certain image, the user detects a rectangular region after capturing an image and then the apparatus processes the captured image based on the detected rectangular region, and thus a temporal delay is generated. This temporal delay is problematic, and an improvement is needed to reduce or even eliminate the temporal delay.

SUMMARY

In view of at least the aforementioned discussion, a novel and non-obvious digital image processing method of detecting a rectangular region from a preview image in advance is provided such that perspective transform is easily performed after an image is captured. An apparatus and a non-transitory computer-readable recording medium having recorded thereon a program for executing the digital image processing method are also disclosed herein.

Additional aspects of the disclosure will be set forth in part in the description which follows and, in part, will be apparent from the description, or may be learned by practice of the presented embodiments.

According to one or more embodiments, a digital image processing method may include: receiving a preview image; detecting at least one rectangular region from the preview image and obtaining coordinate information corresponding to the at least one rectangular region; determining a main rectangular region from among the at least one rectangular region detected from the preview image; capturing an image; and generating a perspective-transformed image by performing a perspective transform on the captured image by using coordinate information corresponding to the main rectangular region.

In an aspect, the determining of the main rectangular region may include: determining at least one effective rectangular region having precise or defined coordinates from among the at least one rectangular region detected from the preview image; and determining the main rectangular region from among the least one effective rectangular region according to certain criteria.

In addition, the determining of the at least one effective rectangular region may include determining the at least one effective rectangular region by filtering the coordinate information respectively obtained from a plurality of continuous image frames of the preview image.

According to another aspect, the determining of the at least one effective rectangular region may include determining a rectangular region having the largest size from among the at least rectangular region, as being the at least one effective rectangular region, when respective distances between midpoints of at least one rectangular region detected from the preview image are smaller than a certain threshold value.

The determining of the main rectangular region may include determining the main rectangular region from among the at least one effective rectangular region based on a value of a parameter defining each of the at least one effective rectangular region.

Alternatively or in addition thereto, the determining of the main rectangular region may include determining the main rectangular region from among the at least one effective rectangular region based on a user input.

According to another aspect, the at least one effective rectangular region and the main rectangular region may be displayed on a display together with the preview image.

The digital image processing method may further include: generating a plurality of thumbnails corresponding to the at least one rectangular region detected from the preview image; and displaying the plurality of thumbnails together with the preview image on a display. The apparatus may be configured to perform the aforementioned operations.

According to another aspect, the capturing of the image may include capturing an image by focusing on the main rectangular region by using the coordinate information corresponding to the main rectangular region.

The capturing of the image may include capturing a plurality of images by focusing on each of the at least one rectangular region detected from the preview image, and the generating of the perspective-transformed image may include: selecting an image captured by focusing on the main rectangular region from among the plurality of images; and generating a perspective-transformed image by performing perspective transform on the selected image by using the coordinate information corresponding to the main rectangular region.

According to one or more embodiments, a digital image processing apparatus may include: an image reception unit including circuitry configured to receive a preview image; a rectangular region detection unit including circuitry configured to detect at least one rectangular region from the preview image received from the image reception unit and to obtain coordinate information corresponding to the at least one rectangular region; a rectangular region determination unit including circuitry configured to determine a main rectangular region from among the at least one rectangular region detected by the rectangular region detection unit; an image capturing unit including circuitry configured to capture an image; a perspective-transformed image generation unit including circuitry configured to perform perspective transform on the image captured by the image capturing unit and to generate a perspective-transformed image; and a controller configured to controls the perspective-transformed image generation unit to generate the perspective-transformed image by using coordinate information corresponding to the main rectangular region determined by the rectangular region determination unit.

The rectangular region determination unit may further include: an effective rectangular region determination unit including circuitry configured to determine at least one effective rectangular region from among the at least one rectangular region detected by the rectangular region detection unit; and a main rectangular region determination unit including circuitry configured to determine a main rectangular region from among the at least one effective rectangular region determined by the effective rectangular region determination unit according to certain criteria.

According to an aspect, the effective rectangular region determination unit may be configured to determine the at least one effective rectangular region by filtering coordinate information obtained from each of a plurality of continuous image frames of the preview image in the rectangular region detection unit.

According to an aspect, the effective rectangular region determination unit may be configured to determine a rectangular region, which has a largest size from among the at least one rectangular region, as the at least one effective rectangular region when respective distances between midpoints of the at least one rectangular region detected by the rectangular region detection unit are smaller than a certain threshold value.

According to an aspect, the main rectangular region determination unit may be configured to determine the main rectangular region from among the at least one effective rectangular region determined by the effective rectangular region determination unit based on a value of a parameter defining each of the at least one effective rectangular region.

The main rectangular region determination unit may be configured to determine the main rectangular region from among the at least one effective rectangular region determined by the effective rectangular region determination unit based on a user input.

The controller may be configured to control the at least one effective rectangular region and the main rectangular region to be displayed on a display together with the preview image.

The digital image processing apparatus may further include a thumbnail image generation unit including circuitry configured to generate a plurality of thumbnail images corresponding to the at least one rectangular region detected by the rectangular region detection unit, and the controller may be configured to control the plurality of thumbnail images generated by the thumbnail image generation unit and the preview image to be displayed on a display together with the preview image.

The image capturing unit may be configured to use the coordinate information corresponding to the main rectangular region determined by the main rectangular region determination unit and capture an image by taking a focus on the main rectangular region.

The image capturing unit may be configured to capture a plurality of images by taking a focus of each of the at least one rectangular region detected by the rectangular region detection unit, and the controller may be configured to control the perspective-transformed image generation unit to generate a perspective-transformed image by using the coordinate information corresponding to the main rectangular region determined by the main rectangular region determination unit and an image captured by taking a focus on the main rectangular region.

According to one or more embodiments, a non-transitory computer-readable recording medium having recorded thereon computer program codes, when executed by a processor, performs a method of processing a digital image. The method includes: receiving a preview image; detecting at least one rectangular region from the preview image and obtain coordinate information corresponding to the at least one rectangular region; determining a main rectangular region from among the at least one rectangular region detected from the preview image; capturing an image; and using coordinate information corresponding to the main rectangular region and generating a perspective-transformed image by performing perspective transform on the captured image.

BRIEF DESCRIPTION OF THE DRAWINGS

These and/or other aspects will become more apparent to a person of ordinary skill in the art apparent and more readily appreciated from the following description of the embodiments, taken in conjunction with the accompanying drawings in which:

FIG. 2 is a flowchart with an operative example of a digital image processing method of detecting a rectangular region from a preview image and performing perspective transform on a captured image, according to an embodiment;

FIGS. 12 and 13 are flowcharts showing respective operative examples of a digital image processing method of capturing an image by focusing on a rectangular region detected from a preview image, according to embodiments of the present disclosure.

DETAILED DESCRIPTION

Figure 1:
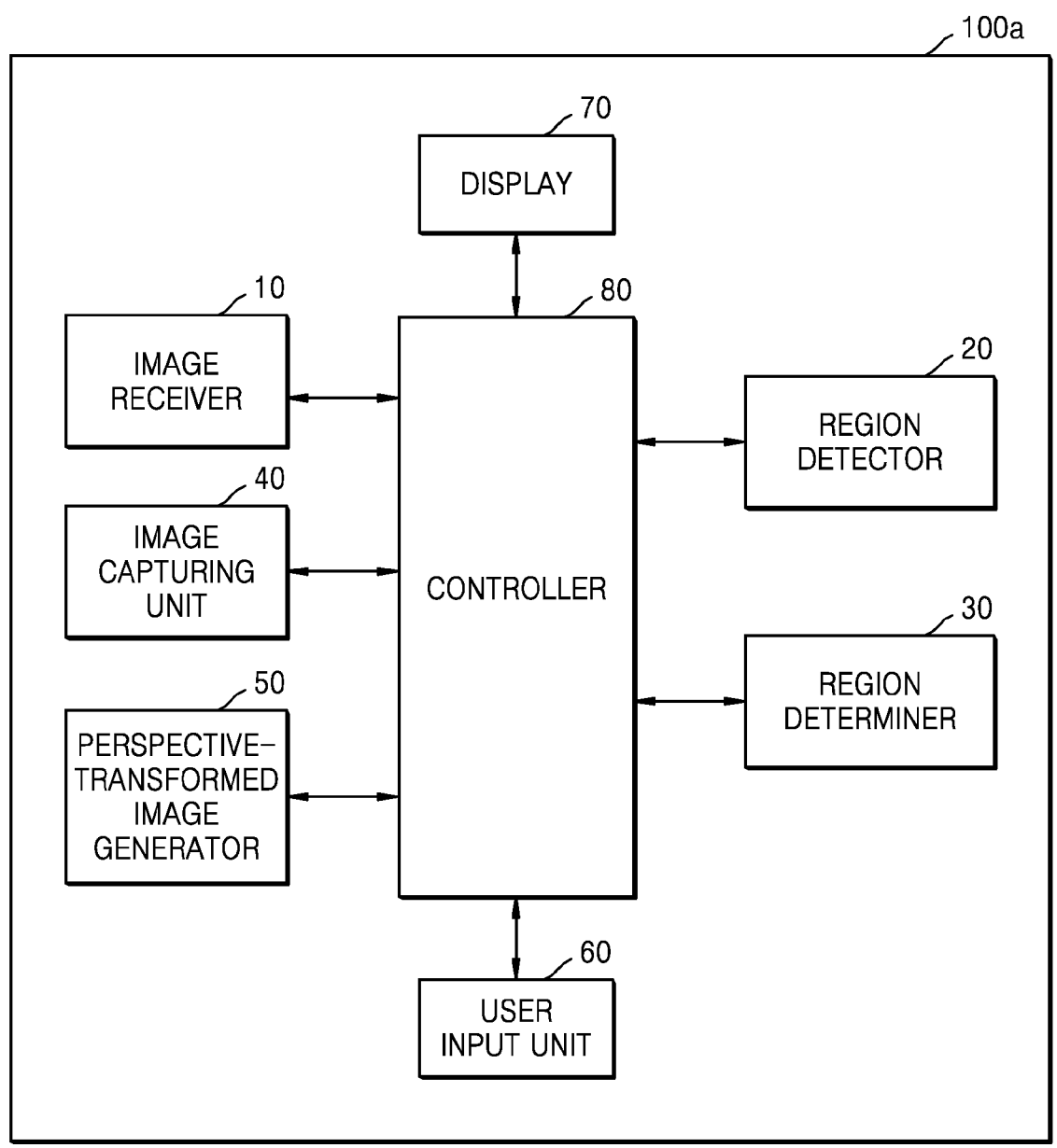
FIG. 1 is a block diagram of a digital image processing apparatus for detecting a rectangular region from a preview image and performing perspective transform on a captured image, according to an embodiment.

As the inventive concept includes various changes that may be made from descriptions provided herein and numerous embodiments, particular embodiments will be illustrated in the drawings and described in detail in the written description. However, the description of certain embodiments herein does not limit the appended claims to particular modes of practice expressly disclosed herein, and it is to be appreciated that all changes, equivalents, and substitutes that do not depart from the spirit and technical scope of the disclosure are encompassed in the appended claims.

While such terms as "first", "second", etc., may be used to describe various components, such components must not be limited to the above terms. The above terms are used only to distinguish one component from another.

The terms used in the present specification are merely used to describe particular embodiments, and a person of ordinary skill in the art understand such terms do not limit the appended claims to just those terms shown and described herein. An expression used in the singular encompasses the expression of the plural, unless it has a clearly different meaning in the context. In the present specification, it is to be understood that the terms such as "including", "having", and "comprising" indicate the existence of the features, numbers, steps, actions, components, parts, or combinations thereof disclosed in the specification, and do not preclude the possibility that one or more other features, items, numbers, steps, actions, components, parts, or combinations thereof may exist or may be added.

Hereinafter, the disclosure describes in detail certain embodiments of the inventive concept with reference to the attached drawings. Like reference numerals in the drawings denote like elements, and repeated descriptions will be omitted.

FIG. 1 is a block diagram of a digital image processing apparatus 100a configured to detect a rectangular region from a preview image and perform perspective transform in a captured image, according to an embodiment of the present disclosure.

The digital image processing apparatus 100a may include an image reception unit 10, a rectangular region detection unit 20, a rectangular region determination unit 30, an image capturing unit 40, a perspective-transformed image generation unit 50, a user input unit 60, a display 70, and a controller 80.

Hereinafter, the aforementioned components will be described in detail.

The image reception unit 10 receives a preview image.

For example, the preview image may be an image including a rectangular subject in order to perform a perspective transform on an image to be captured at a later time.

The rectangular region detection unit 20 may detect a rectangular region from the preview image received from the image reception unit 10.

For example, the rectangular region corresponds to the rectangular subject included in the preview image, and coordinate information obtained from the rectangular region may be used to perform perspective transform on the image to be captured subsequently.

In this case, since a variety of methods of detecting a rectangular region from a preview image are well-known, a method of detecting a rectangular region from a preview image is not limited to a particular method.

Also, the coordinate information according to an embodiment may include coordinate information of pixels corresponding to each vertex of the rectangular region detected from the preview image.

The coordinate information will now be described in detail with reference to FIGS. 3A and 3B.

The rectangular region determination unit 30 (i.e. region determiner) may determine a main rectangular region from among at least one rectangular region detected by the rectangular region detection unit 20 (i.e. region detector).

For example, the main rectangular region may be a rectangular region that is subjected to a perspective transform in a captured image from among the at least one rectangular region detected from the preview image. In this case, the rectangular region determination unit 30 may further include an effective rectangular region determination unit 33 and a main rectangular region determination unit 35, which will be described in detail with reference to FIGS. 4, 5, 6 and 7.

Also, the main rectangular region may be determined based on a value of a parameter defining each rectangular region from among the at least one rectangular region detected by the rectangular region detection unit 20. For example, the value of the parameter defining each rectangular region may include a size of a rectangular region, a distortion degree of a rectangular region, respective distances between at least one rectangular region based on a midpoint of the preview, or the like.

Also, the main rectangular region may be determined based on a user input from among the at least one rectangular region detected by the rectangular region detection unit 20. In this case, the main rectangular region may be changed based on a user input according to a user's intention.

The main rectangular region will be described in detail with reference to FIGS. 8A and 8B.

The image capturing unit 40 may capture a preview image received from the image reception unit 10 (i.e. image receiver).

For example, an image captured by the image capturing unit 40 may include an image that is the same as the preview image.

Also, the image capturing unit 40 may use the coordinate information corresponding to the main rectangular region determined by the main rectangular region determination unit 35 (i.e. main region determiner) in order to capture an image by focusing on the main rectangular region.

On the contrary, when pieces of information regarding depths of rectangular regions detected by the rectangular region detection unit 20 are different from each other, the image capturing unit 40 may capture images by focusing on each rectangular region. In this case, the fact that the pieces of information regarding the depths of rectangular regions are different may be determined based on sizes of edges detected from the rectangular regions.

The depths of rectangular regions will be described in detail with reference to FIGS. 10, 11 and 12.

The perspective-transformed image generation unit 50 may generate a perspective-transformed image by performing perspective transform on the image captured by the image capturing unit 40.

For example, the perspective-transformed image generation unit 50 may generate a perspective-transformed image by using the coordinate information corresponding to the main rectangular region which is determined by the rectangular region determination unit 30 in order to perform the perspective transform on the image captured by the image capturing unit 40.

Accordingly, the digital image processing apparatus 100*a* detects a rectangular region from a preview image before capturing an image and may use the obtained coordinate information to quickly perform perspective transform after capturing the image and reduce or eliminate temporal delay.

Also, the perspective-transformed image that is generated by the perspective-transformed image generation unit 50 (i.e. perspective-transformer image generator) may be displayed on the display 70. Accordingly, the digital image processing apparatus 100*a* allows a user to directly check a rectangular region, which is subjected to the perspective transform, in the preview image before capturing an image, and after capturing the image, the digital image processing apparatus 100*a* allows the user to check the perspective-transformed image which is generated after the perspective transform is performed.

With reference at least to FIG. 1, all operations of the digital image processing apparatus are controlled by the controller 80 overall, which is comprised of at least one processor or microprocessor including circuitry configured for operation. The digital image processing apparatus includes a user input unit 60 including a key that generates electrical signals from the user, or the like. The electrical signals from the user input unit 60 are routed (i.e. sent, output, communicated to) to the controller 80, and thus, the controller 80 may control the digital image processing apparatus according to the routed electrical signals.

The controller 80 may use the coordinate information corresponding to the main rectangular region determined by the rectangular region determination unit 30 to control the perspective-transformed image generation unit 50 to generate a perspective-transformed image by using a captured image.

In this case, the controller 80 may control the perspective-transformed image generation unit 50 to generate a perspective-transformed image by using the coordinate information corresponding to the main rectangular region determined by the rectangular region determination unit 30 and the image captured by focusing on the main rectangular region.

The controller 80 may control the effective rectangular region and main rectangular region to be displayed on the display 70 together with the preview image.

Figure 9:
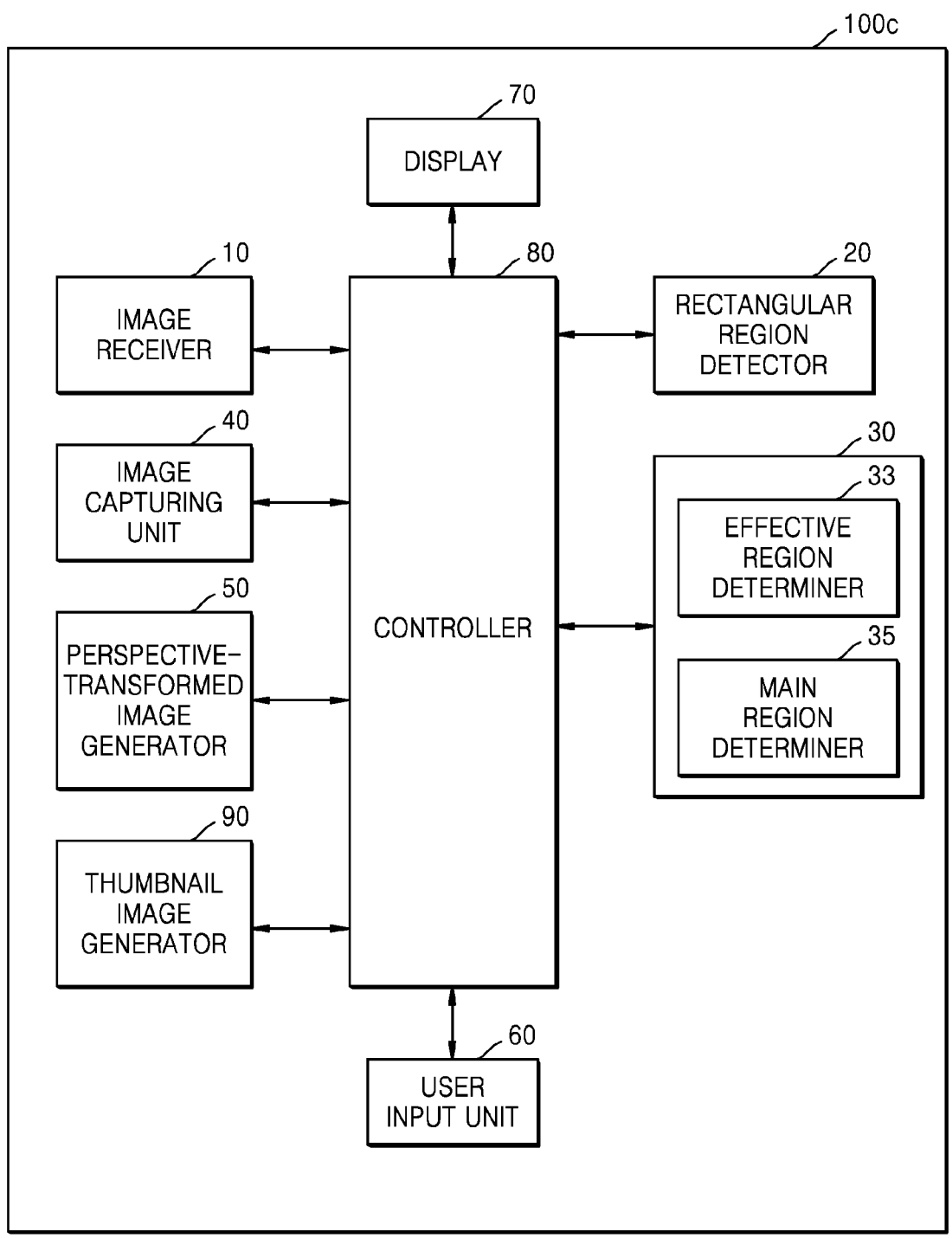
FIG. 9 is a block diagram of a digital image processing apparatus configured to generate a thumbnail image corresponding to a rectangular region detected from a preview image, according to an embodiment of the present disclosure.

With reference to FIG. 9, the controller 80 may control a plurality of thumbnail images generated by a thumbnail image generation unit 90 to be displayed on the display 70 together with the preview image.

The user generates input data used to control operations of the digital image processing apparatus via the user input unit 60. The user input unit 60 may comprise, for example a key pad, a dome switch, a touch pad (in a contact-type electrostatic capacitive manner, a resistive overlay manner, a surface acoustic wave manned, an integral strain gauge manner, a piezo-electric manner, etc.), jog wheel, a jog switch, or the like. In detail, when the touch pad forms an interlayer structure along with the display 70, the touch pad may be referred to as a touch screen.

The user input unit 60 may receive signals determining the main rectangular region, which is subjected to the perspective transform, from among the rectangular regions detected by the rectangular region detection unit 20.

The user input unit 60 may receive signals changing the coordinate information corresponding to the main rectangular region which is subjected to the perspective transform.

The display 70 may include, for example, at least one of a liquid crystal display (LCD), a thin film transistor-liquid crystal display, an organic light-emitting diode (OLED), a flexible display, and a three-dimensional (3D) display.

When the display 70 forms an interlayer structure along with the touch pad and thus becomes a touch screen, the display 70 may also be used as an input device other than an output device. The touch screen may detect a location of a touch input, a touched area, and pressure of a touch input. Also, the touch screen may detect an actual touch as well as from a proximity touch.

The display 70 may display the preview image received from the image reception unit 10 as well as from thumbnail images generated by the thumbnail image generation unit 90.

For example, the thumbnail images may be generated based on the rectangular region detected by the rectangular region determination unit 30. Accordingly, the digital image processing apparatus allows the user to directly check the rectangular region, which is subjected to the perspective transform, from a preview image before an image is captured.

The above operation will now be described in more detail with reference to FIGS. 9 and 10.

The display 70 may display a rectangular region including an effective rectangular region and main rectangular region and the preview image thereon.

Thus, the digital image processing apparatus may allow the user to directly check the rectangular region, which is subjected to the perspective transform, from a preview image before an image is captured and to edit the rectangular region.

The display 70 may display a perspective-transform image that is generated by performing the perspective transform on the image captured by the image capturing unit 40.

Accordingly, right after the user captures an image, the digital image processing apparatus allows the user to immediately check a perspective-transform image that is generated by performing the perspective transform on the captured image.

Operations of the digital image processing apparatus will be sequentially described.

FIG. 2 is a flowchart showing an operative example of a method of processing a digital image according to an embodiment, the method comprising detecting a rectangular region from a preview image and performing perspective transform on a captured image.

With reference to FIG. 2, at operation 100, the digital image processing apparatus receives a preview image.

The preview image may be, for example, an image including a rectangular subject to perform perspective transform on an image to be captured at a later time.

At operation 110, the digital image processing apparatus may detect at least one rectangular region from the preview image received in operation 100, and may obtain coordinate information corresponding to the rectangular region.

For example, the rectangular region corresponds to the rectangular subject included in the preview image, and the coordinate information may include coordinate information of pixels corresponding to respective vertexes of the rectangular region detected from the preview image.

At operation 120, the digital image processing apparatus may determine a main rectangular region from among the at least one rectangular region detected in operation 110.

For example, the main rectangular region may be, for example, a rectangular region, which is subjected to perspective transform in a captured image, from among the at least on rectangular region detected from the preview image.

At operation 130, the digital image processing apparatus may capture an image. For example, the image captured in operation 130 may be a preview image received from the image reception unit 10.

Also, the image captured in operation 130 may be, for example, an image captured by focusing on the main rectangular region determined in operation 120 or may be a plurality of images captured by focusing on each of the at least on rectangular region detected in operation 110.

At operation 140, the digital image processing apparatus may use the coordinate information corresponding to the main rectangular region determined in operation 120 to perform perspective transform on the image captured in operation 130 and then may generate a perspective-transformed image.

Therefore, a method of quickly performing the perspective transform on a captured image by using the coordinate information that is obtained by detecting the rectangular region from the preview image is provided.

In addition, the generated perspective-transformed image may be displayed on the display 70. Accordingly, the digital image processing method enables the user to check the perspective-transformed image that is generated by performing the perspective transform immediately after the user captures an image.

Figure 3A:
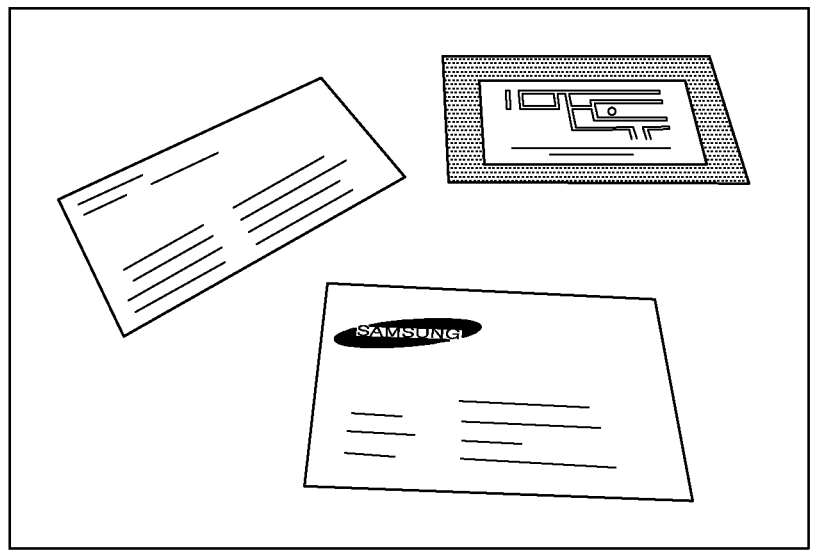
FIG. 3A and FIG. 3B illustrate examples of images in which a digital image processing apparatus according to an the present disclosure detects at least one rectangular region from a preview image and displays the at least one detected rectangular region on a display.
Figure 3B:
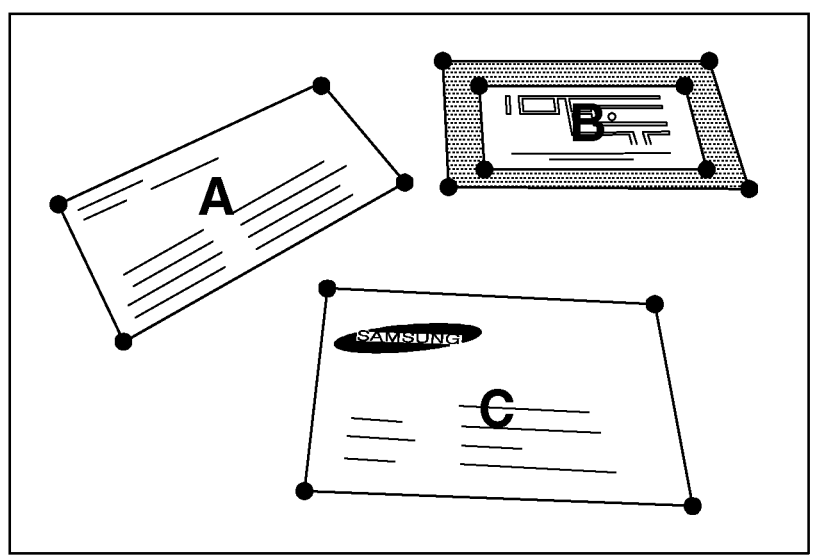

FIGS. 3A and 3B illustrate an example in which a digital image processing apparatus according to an embodiment detects at least one rectangular region from a preview image and displays the at least one detected rectangular region on the display 70.

With reference to FIGS. 3A and 3B, the digital image processing apparatus may be included in a portable terminal such as a mobile phone, a digital camera, or a camcorder which has a camera.

For example, the at least one rectangular region corresponds a rectangular subject included in the preview image, and, as shown in the particular example in FIGS. 3A and 3B, four rectangular regions may be detected.

Also, the at least one rectangular region may be displayed together with the preview image, and, as shown in FIG. 3B, points for the respective regions may be indicated on coordinates corresponding to vertexes of the at least one detected rectangular region.

Figure 4:
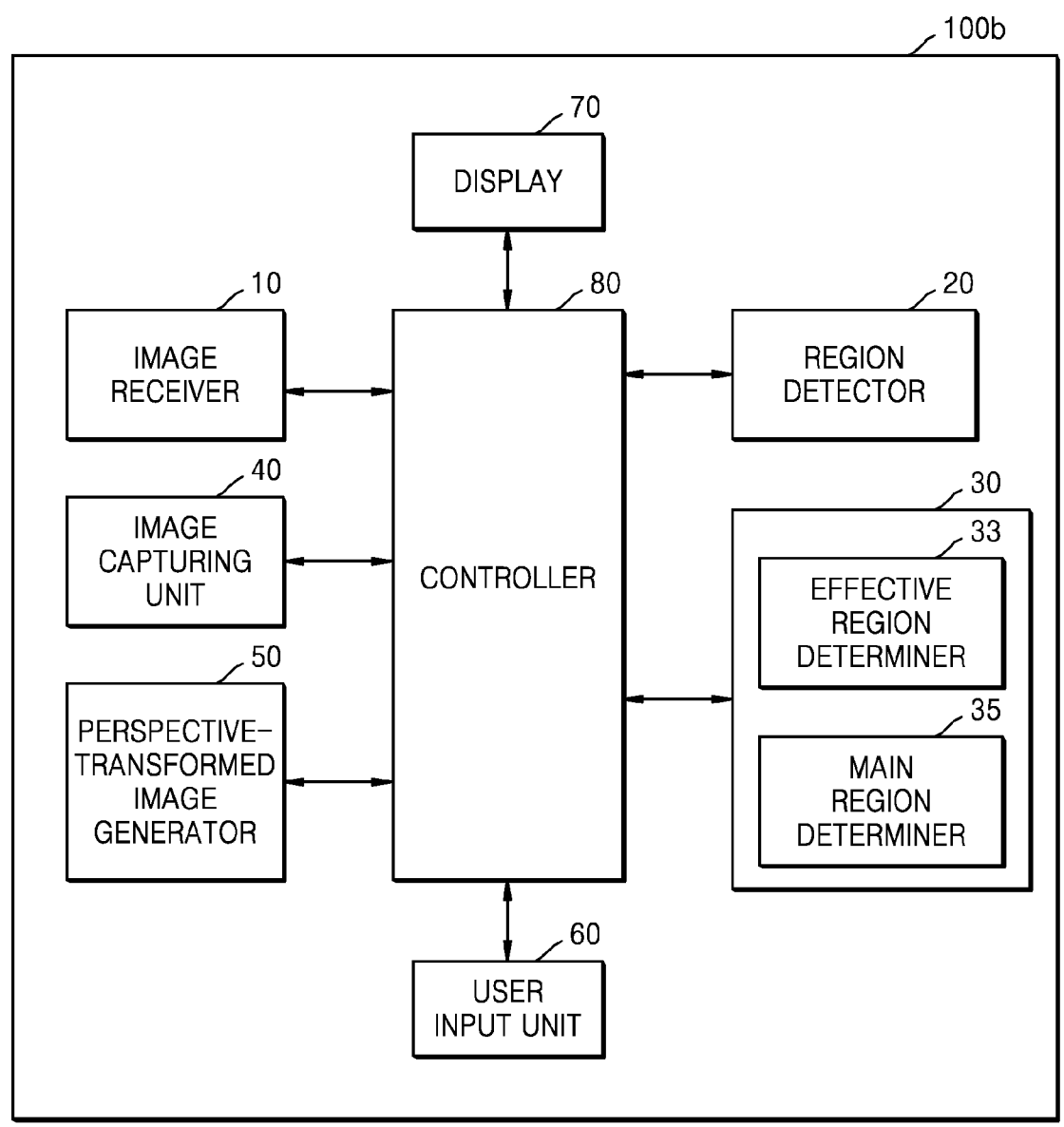
FIG. 4 is a block diagram of a digital image processing apparatus configured to determine a main rectangular region, which is subjected to perspective transform in a captured image, from among at least one rectangular region detected from a preview image.

FIG. 4 is a block diagram of a digital image processing apparatus 100b configured to determine a main rectangular region, which is subjected to perspective transform in a captured image, from among at least one rectangular region detected from a preview image.

The digital image processing apparatus 100b may further include an effective rectangular region determination unit 33 and a main rectangular region determination unit 35 which both include circuitry configured for operation as discussed herein below.

The effective rectangular region determination unit 33 may determine at least one effective rectangular region from among the at least one rectangular region detected by the rectangular region detection unit 20.

For example, the effective rectangular region may be determined by filtering pieces of coordinate information respectively obtained from continuous image frames of the preview image.

The at least one rectangular region of the preview image detected by the rectangular region detection unit 20 may slightly vary due to external factors such as a movement, focus, light reflection, shadow, etc. of a camera, unlike a still image. Therefore, it may be necessary to refine the coordinate information that is obtained in the rectangular region detection unit 20, by the effective rectangular region determination unit 33. In this case, a method of filtering the coordinate information may be performed by using a well-known method, for example, a Kalman method, a method of using an average or median, or the like can be used, and thus, the method of filtering the coordinate information is not limited to a certain method.

The aforementioned method will now be described in detail with reference to FIG. 6.

Also, when respective distances between midpoints of the at least one rectangular region detected by the rectangular region detection unit 20 are smaller than a predetermined threshold value, a rectangular region that has the largest size among the at least one rectangular region may be determined as an effective rectangular region.

The effective rectangular region will now be described in detail with reference to FIGS. 7A and 7B.

The main rectangular region determination unit 35 may determine a main rectangular region from among the at least one effective rectangular region determined by the effective rectangular region determination unit 33 based on predetermined criteria.

For example, the main rectangular region may be determined from among the at least one effective rectangular region determined by the effective rectangular region determination unit 33 based on a value of a parameter defining each of the at least one effective rectangular region. In this case, the value of the parameter defining each of the at least one effective rectangular region may include a size of an effective rectangular region, a degree of distortion thereof, respective distances between at least one rectangular region based on a midpoint of the preview image, or the like.

In addition, the main rectangular region may be determined from among the at least one effective rectangular region determined by the effective rectangular region determination unit 33 based on a user input. In this case, the main rectangular region may be changed based on a user input according to a user's intention.

The main rectangular region will now be described in detail with reference to FIGS. 8A and 8B.

Operations of a digital image processing apparatus will be sequentially described in detail.

Figure 5:
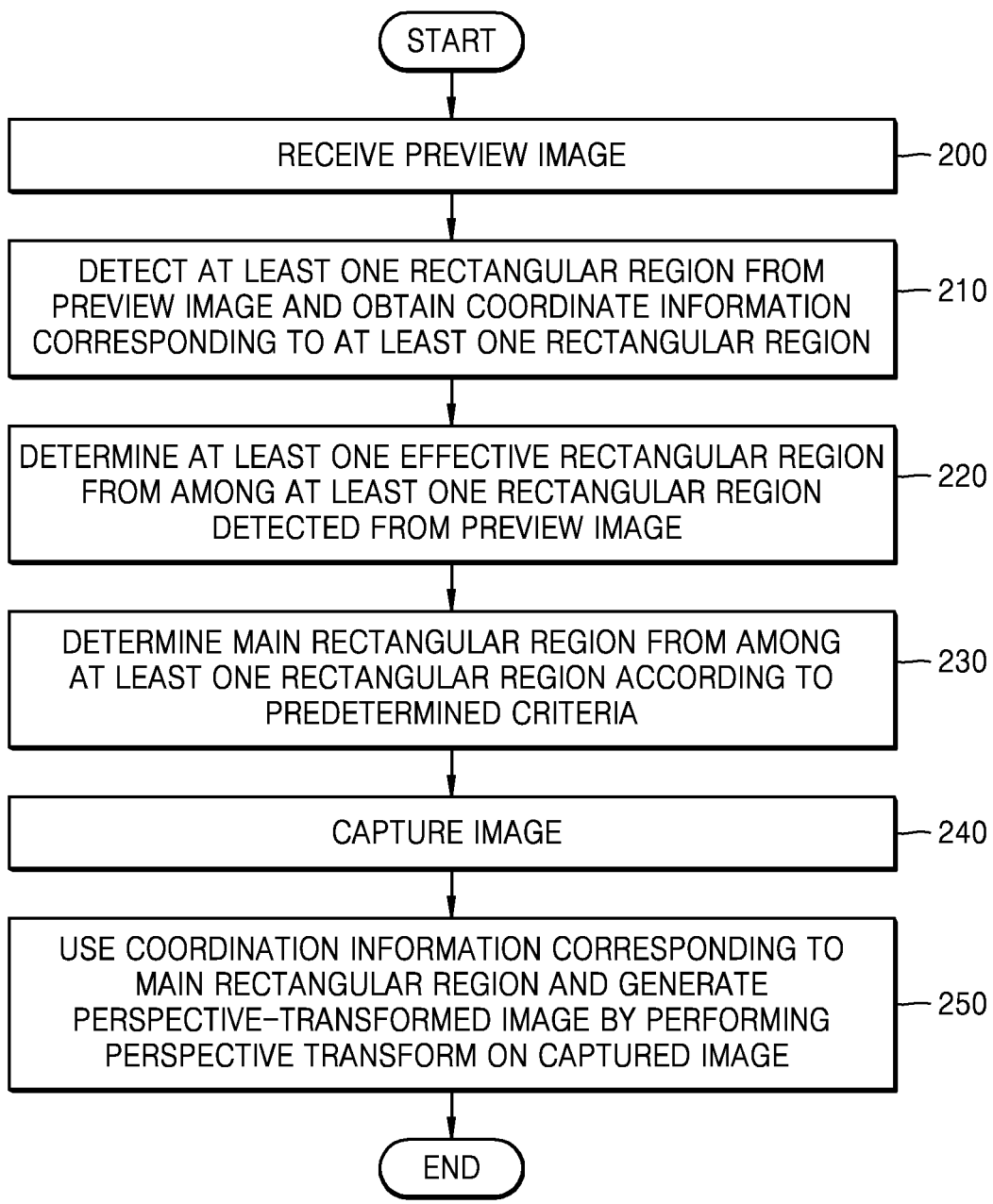
FIG. 5 is a flowchart with an operative example of a digital image processing method of determining a main rectangular region, which is subjected to perspective transform, from among at least one rectangular region detected from a preview image, according to an embodiment.

FIG. 5 is a flowchart showing an operative example of a method of processing a digital image according to an embodiment, the method comprising determining a main rectangular region, which is subjected to perspective transform, from among at least one rectangular region detected from a preview image.

With reference to FIG. 5, operations 200, 210, 240, and 250 correspond to operations 100, 110, 130, and 140 of FIG. 2, and thus, detailed descriptions thereof will be omitted.

At operation 220, the digital image processing apparatus may determine at least one effective rectangular region from the at least one rectangular region detected in operation 210.

For example, the at least one effective rectangular region may be determined by filtering pieces of coordinate information that are respectively obtained from continuous image frames of the preview image.

Also, when respective distances between the midpoints of the at least one rectangular region detected by the rectangular region detection unit 20 are smaller than a predetermined threshold value, a rectangular region that has a largest size among the at least one rectangular region may be determined as an effective rectangular region.

At operation 230, the digital image processing apparatus may determine the main rectangular region from among the at least one effective rectangular region determined in operation 220 based on predetermined criteria.

For example, the main rectangular region may be determined from among the at least one effective rectangular region determined by the effective rectangular region determination unit 33 based on a value of a parameter defining each of the at least one effective rectangular region. In addition, the main rectangular region may be determined from among the at least one effective rectangular region determined by the effective rectangular region determination unit 33 based on a user input.

Figure 6:
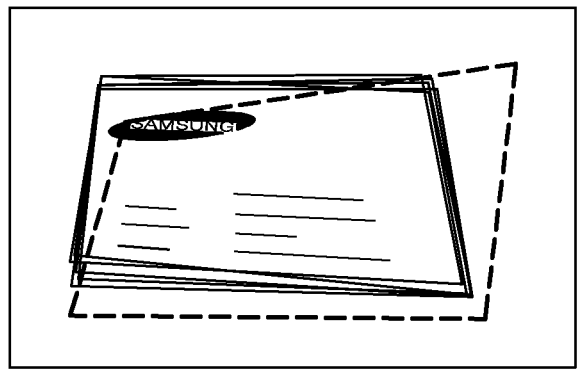
FIG. 6, FIG. 7A, and FIG. 7B illustrate various examples in which a digital image processing apparatus according to an embodiment of the present disclosure determines an effective rectangular region from a preview image.
Figure 7A:
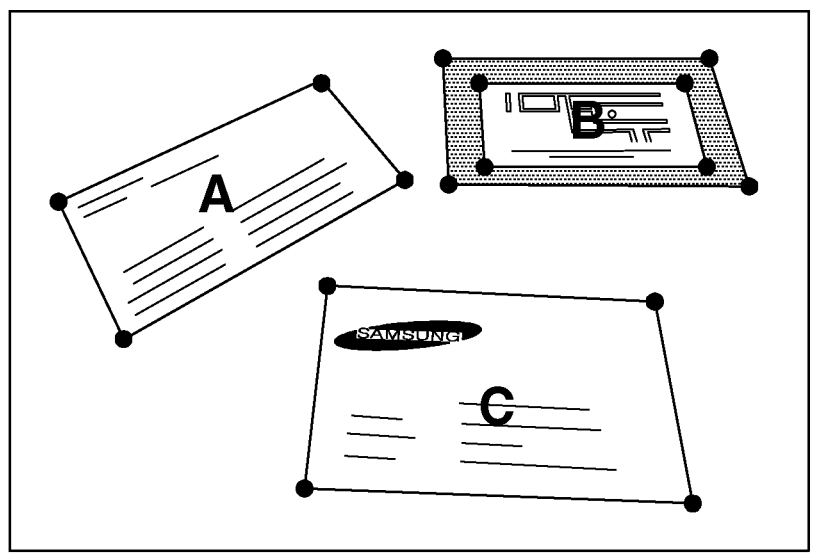
Figure 7B:
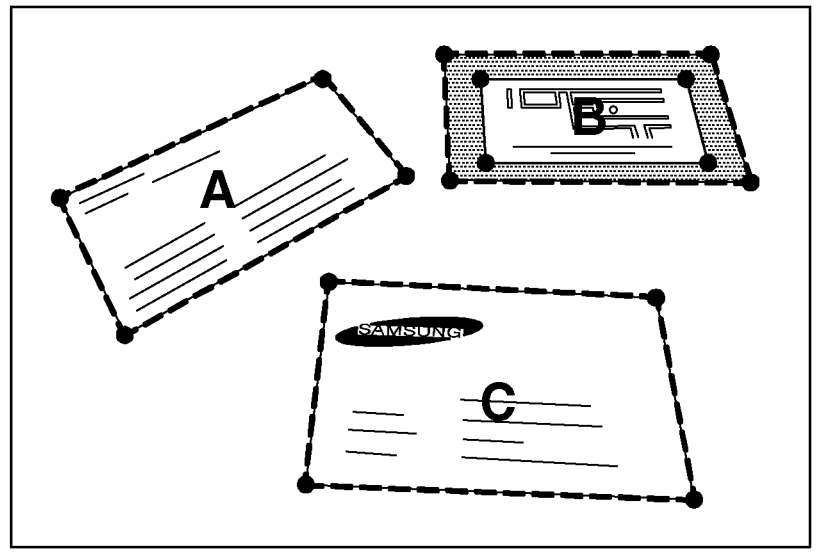

FIGS. 6 to 7B illustrate various examples in which a digital image processing apparatus according to an embodiment determines an effective rectangular region from a preview image.

The preview image may have rectangular regions that slightly vary according to external factors such as a movement, focus, light reflection, shadow, etc. of a camera. Therefore, as shown in FIG. 6, when pieces of coordinate information that are respectively obtained from continuous image frames of the preview image are filtered, inappropriate rectangular regions (i.e., edges indicated by a dashed line) are excluded, and appropriate rectangular regions (i.e., edges indicated by a solid line) may be determined as at least one effective rectangular region.

As shown in FIG. 7A, rectangular regions (B) detected from the preview image may have the same midpoint, and in this case, as shown in FIG. 7B, an outermost rectangular region that has a largest size among the rectangular regions may be determined as an effective rectangular region.

Figure 8A:
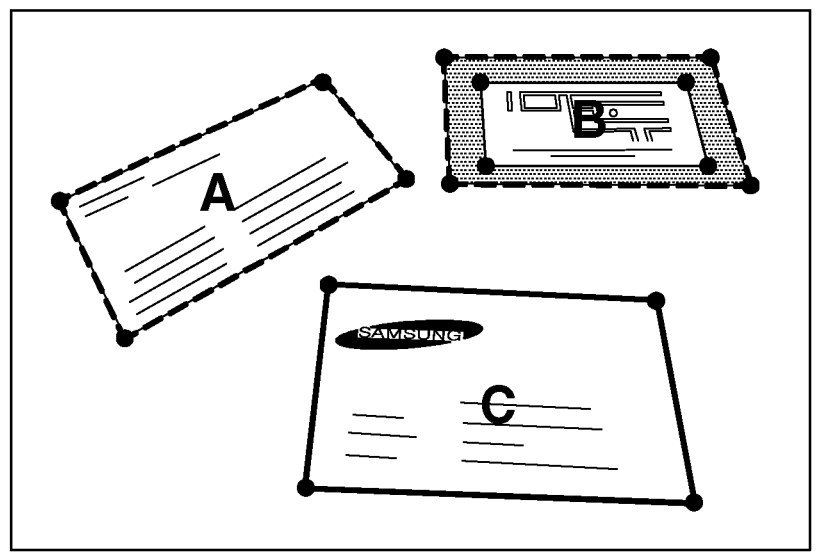
FIG. 8A and FIG. 8B illustrate various examples in which a digital image processing apparatus according to an embodiment of the present disclosure determines a main rectangular region from a preview image and displays the determined main rectangular region on a display.
Figure 8B:
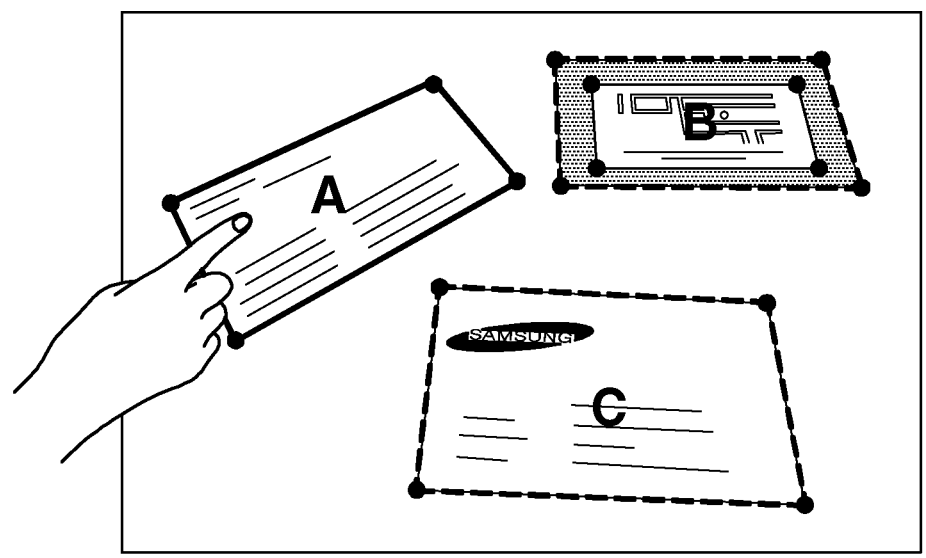

FIGS. 8A and 8B illustrate various examples in which a digital image processing apparatus according to an embodiment determines a main rectangular region from a preview image and displays the determined main rectangular region on the display 70.

For example, the main rectangular region may be determined from among the at least one effective rectangular region determined in the preview image based on predetermined criteria.

For example, the main rectangular region may be determined based on a value of a parameter defining each of the at least one effective rectangular region, and, as shown in FIG. 8A, an effective rectangular region C that has the largest size may be determined as the main rectangular region.

In this case, the main rectangular region may be changed according to the user's intention, and, as shown in FIG. 8B, when the user touches the inside of an effective rectangular region A, the effective rectangular region A including a coordinate of a touched location may be determined as the main rectangular region.

Also, the at least one effective rectangular region and main rectangular region may be displayed on the display 70 together with the preview image, and, as shown in FIGS. 8A and 8B, the at least one effective rectangular region may be indicated by a dashed line, and the main rectangular region may be indicated by a solid line. Accordingly, the digital image processing apparatus may allow the user to directly check a rectangular region, which is subjected to the perspective transform, in the preview image before capturing an image and to edit the rectangular region.

FIG. 9 is a block diagram of a digital image processing apparatus 100c configured to generate a thumbnail image corresponding to a rectangular region detected from a preview image, according to an embodiment.

The digital image processing apparatus 100c may further include a thumbnail image generation unit 90.

The thumbnail image generation unit 90 may generate thumbnail images corresponding to the at least one rectangular region detected by the rectangular region detection unit 20.

For example, the thumbnail images may be generated based on the at least one determined by the effective rectangular region determination unit 33.

In this case, the thumbnail images may be displayed on the display 70 together with the preview image. Accordingly, the digital image processing apparatus may allow the user to directly check a rectangular region, which is subjected to the perspective transform, in the preview image before capturing an image and to edit the rectangular region.

Figure 10:
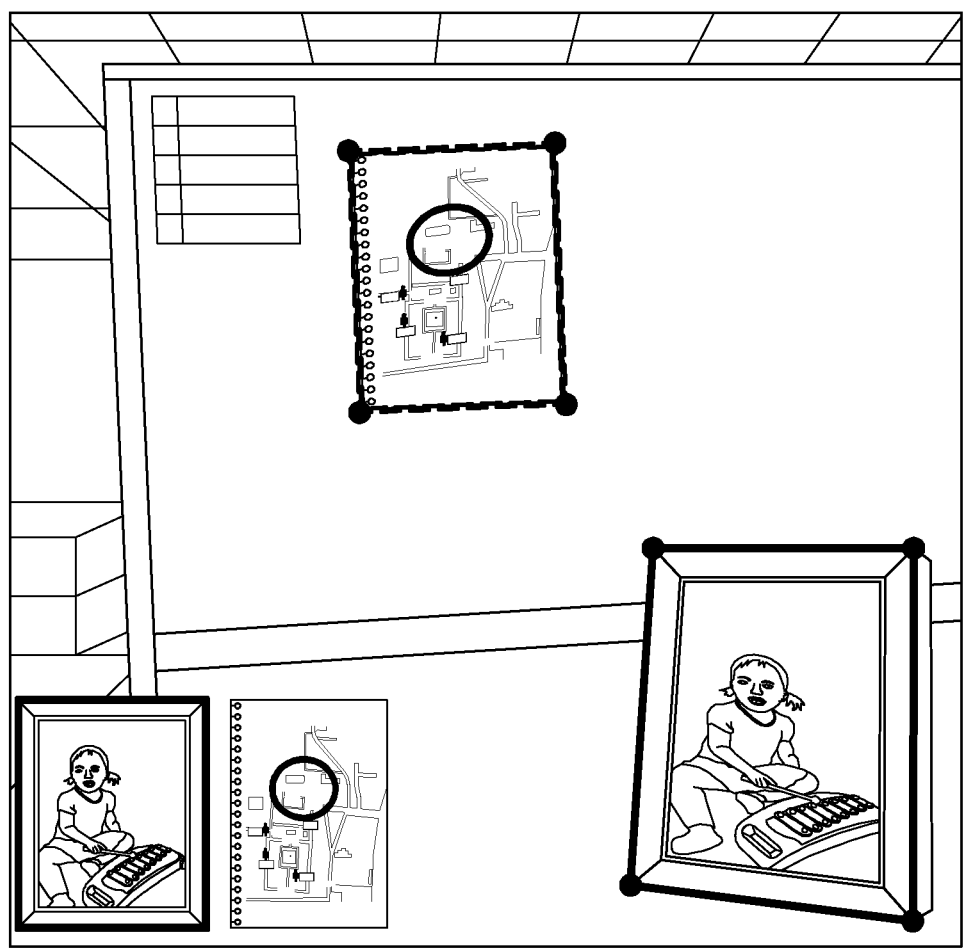
FIG. 10 illustrates an example in which a digital image processing apparatus according to an embodiment of the present disclosure displays a plurality of thumbnail images on a display together with a preview image.

FIG. 10 illustrates an example in which a digital image processing apparatus according to an embodiment displays a plurality of thumbnail images on the display 70 together with a preview image.

As shown in FIG. 10, the thumbnail images, which are generated based on rectangular regions indicated by a dashed line, that is, the at least one effective rectangular region determined in the preview image, and a rectangular region indicated by a solid line, that is, the main rectangular region, may be displayed together with the preview image.

In this case, as shown in FIG. 10, the thumbnail images generated based on the main rectangular region may be displayed differently from the thumbnail images generated based on the at least one effective rectangular region.

Accordingly, the digital image processing apparatus displays the at least one effective rectangular region and the main rectangular region in the preview image together with the thumbnail images corresponding thereto, and thus, the user may check an image, for which the perspective transform is performed, in advance after capturing an image.

Figure 11A:
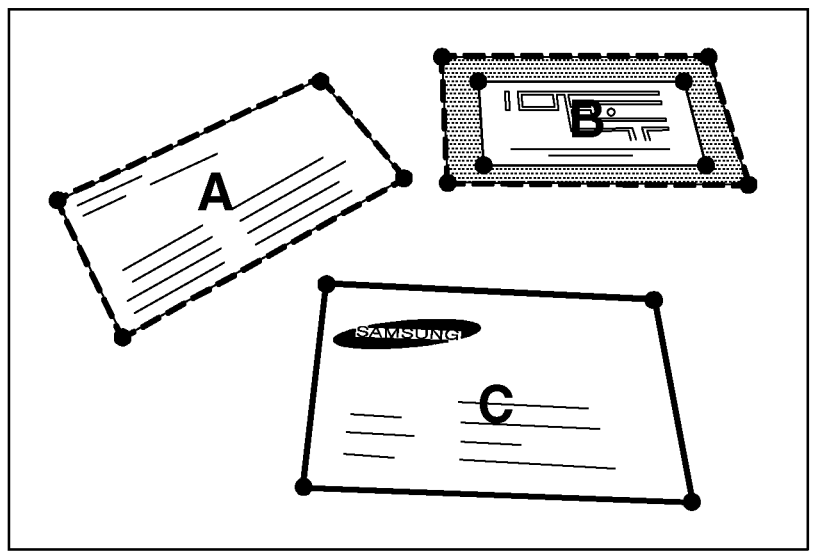
FIG. 11A and FIG. 11B illustrate an example in which a digital image processing apparatus according to an embodiment of the present disclosure utilizes coordinate information of a main rectangular region determined in a preview image in order to display, on a display, a perspective-transformed image generated by performing perspective transform on a captured image.
Figure 11B:
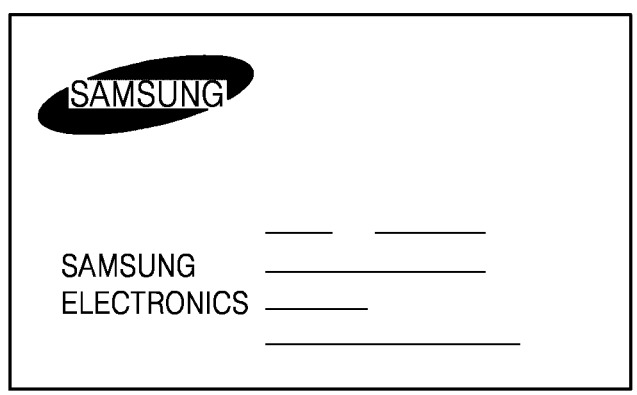

FIGS. 11A and 11B illustrate an example in which a digital image processing apparatus according to an embodiment uses coordinate information of a main rectangular region determined in a preview image in order to display, on the display 70, a perspective-transformed image generated by performing a perspective transform on a captured image.

The perspective-transformed image, which is generated based on coordinate information (coordinates of vertexes of a rectangular region) of the main rectangular region (a rectangular region indicated by a solid line) displayed in the preview image and a captured image as shown in FIG. 11A, may be displayed on the display 70 as shown in FIG. 11B. Accordingly, right after the user captures an image, the digital image processing apparatus may allow the user to immediately check the perspective-transformed image generated by performing the perspective transform on the captured image.

Operations of the digital image processing apparatus are sequentially described in detail.

Figure 13:
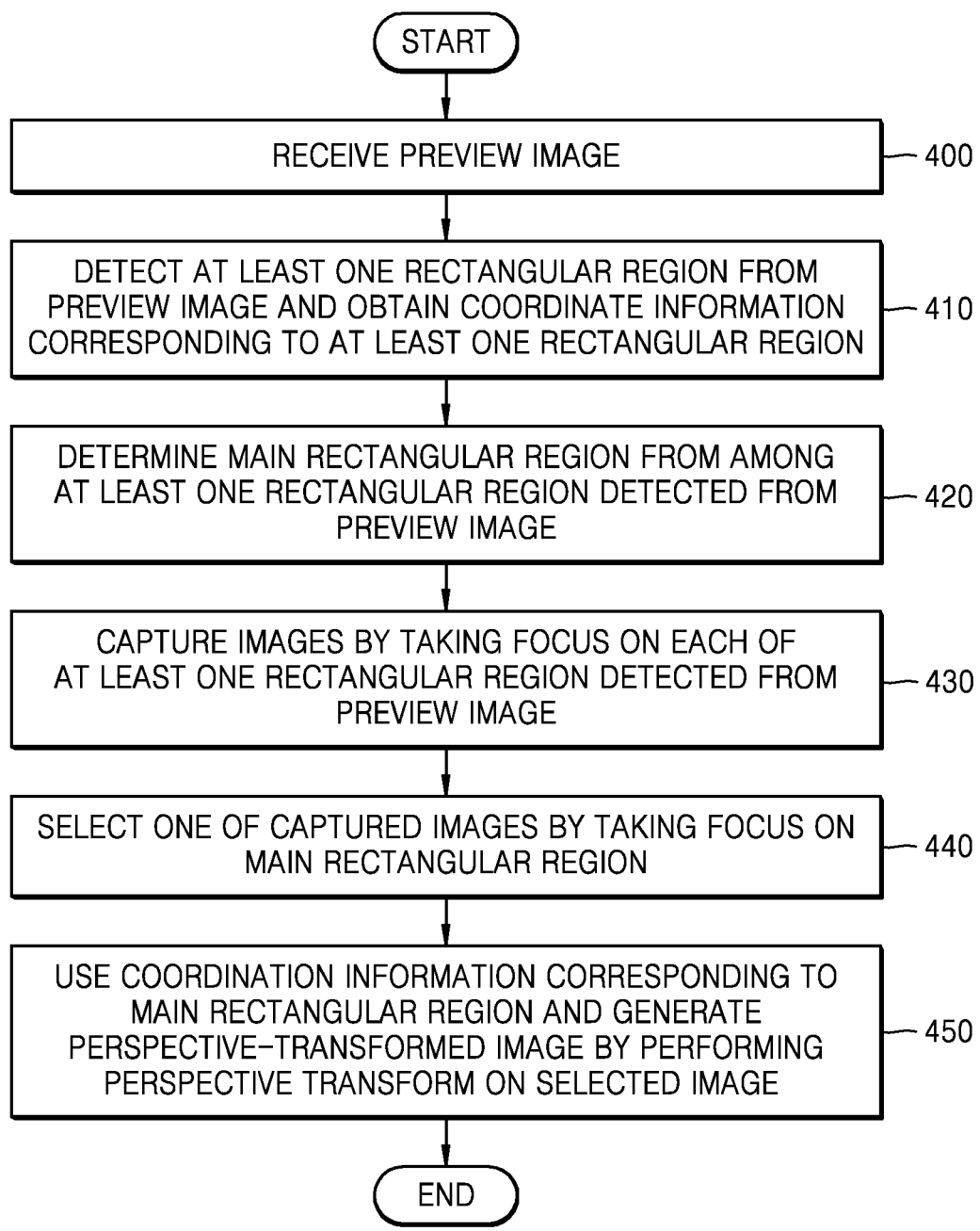

FIGS. 12 and 13 are flowcharts of a method of processing a digital image according to an embodiment, the method comprising capturing an image by focusing on a rectangular region detected from a preview image.

Operations 300 to 320, and 340 of FIG. 12 correspond to operations 100 to 120, and 140 of FIG. 2, and thus, detailed description thereof will be omitted.

At operation 330, the digital image processing apparatus uses coordinate information corresponding to the main rectangular region determined in operation 320 to capture an image by focusing on the main rectangular region.

For example, the coordinate information corresponding to the main rectangular region may be used as information on an autofocus (AF) area when an image is captured. Accordingly, according to the method of processing the digital image, a high-quality perspective-transformed image may be provided by performing the perspective transform based on an image captured by focusing on the main rectangular region, which is subjected to the perspective transform.

Operations 400 to 420 of FIG. 13 correspond to operations 100 to 120 of FIG. 2, and thus, detailed description thereof will be omitted.

In the method of processing the digital image, the main rectangular region, which is subjected to the perspective transform, may be changed according to the user's intention even after the perspective-transformed image is generated.

In this case, when the user wants to re-perform the perspective transform on the image, which is previously captured by focusing on the main rectangular region, based on the changed main rectangular region, the quality of a perspective-transformed image to be generated may be degraded because the perspective transform is to be performed for an image that is out of focus.

In operation 430, the digital image processing apparatus may capture images by focusing on each of the at least one rectangular region detected in operation 410.

For example, when pieces of information regarding depths of the at least one rectangular region detected from the preview image differ, the images may be captured by focusing on each of the at least one rectangular region.

In this case, the fact that the pieces of information regarding depths of the at least one rectangular region detected from the preview image differ may be determined based on sizes of edges detected from the at least one rectangular region.

In operation 440, the digital image processing apparatus may select one of the images captured in operation 430, which is captured by focusing on the main rectangular region.

For example, the main rectangular region may not be determined in operation 420.

In operation 450, the digital image processing apparatus uses coordinate information corresponding to the main rectangular region and may generate a perspective-transformed image by performing perspective transform on the image selected in operation 440.

According to the method of processing the digital image, images may be captured by focusing on each of the at least one rectangular region when the at least one rectangular region having different pieces of information regarding depths thereof is detected from the preview image. Thus, although the main rectangular region is changed subsequently according to the user's intention, an image, which is captured by focusing on the changed main rectangular region, is selected, and the perspective transform may be performed for the selected image.

Therefore, according to the method of processing the digital image, a high-quality perspective-transform image may be generated by performing the perspective transform on the image captured by focusing on the changed main rectangular region.

Figure 14A:
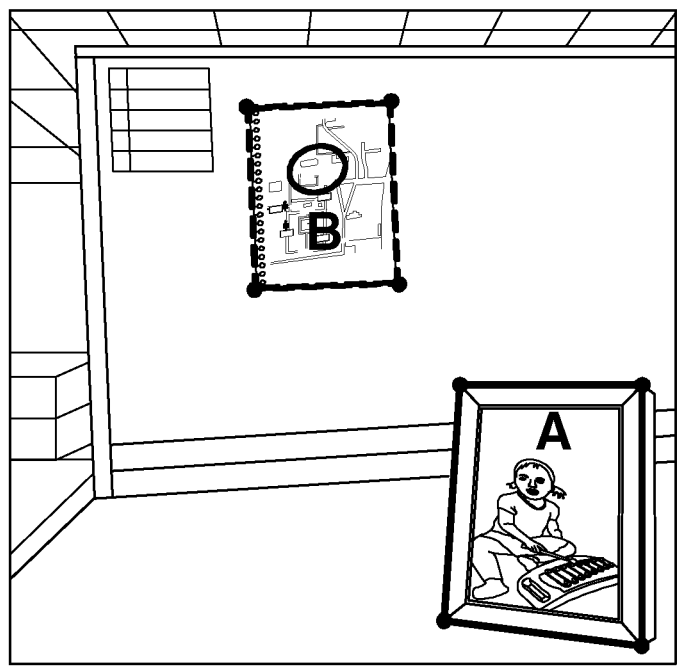
FIG. 14A, FIG. 14B and FIG. 14C illustrate examples in which a digital image processing apparatus according to an embodiment of the present disclosure displays, on a display, a perspective-transformed image generated by performing perspective transform on an image captured by focusing on a rectangular region detected from a preview image.
Figure 14B:
Figure 14C:
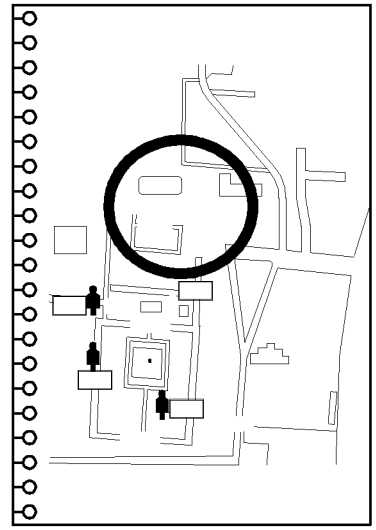

FIGS. 14A to 14C illustrate examples in which a digital image processing apparatus according to an embodiment displays, on the display 70, a perspective-transformed image generated by performing a perspective transform on an image captured by focusing on a rectangular region detected from a preview image.

As shown in FIG. 14A, when two rectangular regions A and B having different pieces of information regarding depths thereof are detected from the preview image, the digital image processing apparatus may capture two images by focusing on each of the rectangular regions A and B.

In this case, when the rectangular region A in FIG. 14A is determined as a main rectangular region based on a user input, the digital image processing apparatus may generate a perspective-transformed image shown in FIG. 14B by using the image captured by focusing on the rectangular region A and coordinate information of the rectangular region A.

On the contrary, when the main rectangular region is changed to the rectangular region B based on a user input, the digital image processing apparatus may generate a perspective-transformed image, such as shown in FIG. 14C by using the image captured by focusing on the rectangular region B and coordinate information of the rectangular region B. Therefore, although the main rectangular region is changed according to the user's intention, the digital image processing apparatus may generate a high-quality perspective-transformed image by performing the perspective transform based on an image captured by focusing on the changed main rectangular region.

The device described herein may comprise a processor, a memory for storing program data and execution same, a permanent storage unit such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributive manner. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

The present disclosure may be described in terms of functional block components and various processing steps. Such functional blocks may be realized by any number of hardware and/or software components configured to perform the specified functions. For example, the inventive concept may employ various integrated circuit (IC) components, e.g., memory elements, processing elements, logic elements, look-up tables, and the like, which may carry out a variety of functions under the control of one or more microprocessors or other control devices. Similarly, where the elements of the inventive concept are implemented using software programming or software elements, the inventive concept may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the inventive concept could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative examples of the present disclosure and are not intended to otherwise limit the scope of the inventive concept in any way. For the sake of brevity, conventional electronics, control systems, software development and other functional aspects of the systems may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device. Moreover, no item or component is essential to the practice of the inventive concept unless the element is specifically described as "essential" or "critical".

The use of the terms "a" and "an" and "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The inventive concept is not limited to the described order of the steps. The use of any and all examples, or language (e.g., "such as") provided herein, is intended merely to better illuminate the present disclosure and does not pose a limitation on the scope of the inventive concept unless otherwise claimed. Numerous modifications and adaptations will be readily apparent to one of ordinary skill in the art without departing from the spirit and scope of the present disclosure.

While the examples include descriptions of a rectangular regions, and rectangular region detectors, an artisan should appreciate that the appended claims are limited to rectangular regions of images, and there can be a variation in imaging, for example, such as in a square to quadrilateral mapping.

The apparatuses and methods of the disclosure can be implemented in hardware, and in part as firmware or as machine executable computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc., that may store or receive machine executable code or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" constitute hardware in the claimed disclosure that contain circuitry that is configured for operation. Under the broadest reasonable interpretation, the appended claims constitute statutory subject matter in compliance with 35 U.S.C. § 101 and none of the elements are software per se.

The definition of the terms "unit" or "module" as referred to herein are to be understood as constituting hardware circuitry such as a CCD, CMOS, SoC, RISC, FPGA, a processor or microprocessor (a controller) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. § 101 and do not constitute software per se. In addition, the controllers shown herein are hardware that are comprised of components, for example, a processor or microprocessor configured for operation by the algorithms shown in the flowcharts and described herein.

What is claimed is:
1. A digital image processing method comprising:
receiving a preview image;
detecting by a controller a plurality of rectangular objects in the preview image and obtaining coordinate information corresponding to the plurality of rectangular objects;
determining a main rectangular object that has a largest size from among the plurality of rectangular objects in the preview image by the controller, when respective distances between midpoints of the plurality of rectangular objects detected from the preview image are smaller than a predetermined threshold value;
capturing an image corresponding to the preview image, after detecting the plurality of rectangular objects and determining the main rectangular object, wherein cap- turing the image further comprises focusing on the main rectangular object determined by the controller; and generating a perspective-transformed image by performing perspective transform on the captured image using coordinate information corresponding to the main rectangular object.

2. The digital image processing method of claim 1, wherein the determining of the main rectangular object comprises:
   determining at least one effective rectangular object having defined coordinates from among the plurality of rectangular objects detected from the preview image; and
   determining the main rectangular object from among the plurality of rectangular objects according to a predetermined criteria.

3. The digital image processing method of claim 2, wherein the determining of the at least one effective rectangular object comprises the coordinate information respectively obtained from a plurality of continuous image frames of the preview image.

4. The digital image processing method of claim 2, wherein the determining of the main rectangular object comprises determining from among the at least one effective rectangular object based on a value of a parameter defining each of the at least one effective rectangular object.

5. The digital image processing method of claim 2, wherein the determining of the main rectangular object comprises determining from among the at least one effective rectangular object based on a user input.

6. The digital image processing method of claim 2, wherein the at least one effective rectangular object and the main rectangular object are displayed together with the preview image.

7. The digital image processing method of claim 1, further comprising:
   generating a plurality of thumbnails corresponding to the plurality of rectangular objects detected from the preview image; and
   displaying the plurality of thumbnails together with the preview image.

8. The digital image processing method of claim 1, wherein the capturing of the image comprises capturing a plurality of images by focusing on each of the at least one rectangular region detected from the preview image, and
   the generating of the perspective-transformed image comprises:
      selecting an image captured by focusing on a main rectangular region from among the plurality of images; and
      generating the perspective-transformed image by performing the perspective transform on the selected image by utilizing the coordinate information corresponding to the main rectangular region.

9. A digital image processing apparatus comprising:
memory; and
one or more processor operably coupled with the memory, the one or more processor configured to:
receive a preview image;
detect by the one or more processors a plurality of rectangular objects from the preview image and to obtain coordinate information corresponding to the plurality of rectangular objects;
determining a main rectangular object that has a largest size from among the plurality of rectangular objects in the preview image by the one or more processors, when respective distances between midpoints of the plurality of rectangular objects detected are smaller than a predetermined threshold value;
capture an image corresponding to the preview image, after detecting the plurality of rectangular objects and determining the main rectangular object, wherein capturing the image further comprises focusing on the main rectangular object determined by the one or more processors; and
generate a perspective-transformed image by performing a perspective transform on the captured image using coordinate information corresponding to the main rectangular object.

10. The digital image processing apparatus of claim 9, wherein the one or more processor is further configured to:
   determine at least one effective rectangular object from among the plurality of rectangular objects; and
   determine the main rectangular object from among the at least one effective rectangular object according to a predetermined criteria.

11. The digital image processing apparatus of claim 10, wherein the one or more processor is further configured to determine the at least one effective rectangular object by filtering coordinate information obtained from each of a plurality of continuous image frames of the preview image.

12. The digital image processing apparatus of claim 10, wherein the one or more processor is further configured to determine the main rectangular object from among the at least one effective rectangular object determined by the one or more processors based on a value of a parameter defining each of the at least one effective rectangular object.

13. The digital image processing apparatus of claim 10, wherein the one or more processor is further configured to determine the main rectangular object from among the at least one effective rectangular object based on a user input.

14. The digital image processing apparatus of claim 10, wherein the one or more processor is further configured to control the at least one effective rectangular object and the main rectangular object on a display together with the preview image.

15. The digital image processing apparatus of claim 9, wherein the one or more processor is further configured to generate a plurality of thumbnail images corresponding to the plurality of rectangular objects detected, and
   display the plurality of thumbnail images and the preview image together on a display.

16. The digital image processing apparatus of claim 9, wherein the one or more processor is further configured to capture a plurality of images by taking a focus on each of the at least one rectangular region, and
   generate a perspective-transformed image by using the coordinate information corresponding to a main rectangular region and an image captured by taking a focus on the main rectangular region.

17. A non-transitory computer-readable recording medium having recorded thereon computer program codes, when executed by a processor, performs a method of processing a digital image, wherein the method comprises:
   receiving a preview image;
   detecting by a controller a plurality of rectangular objects in the preview image and obtaining coordinate information corresponding to the plurality of rectangular objects;
   determining a main rectangular object that has a largest size from among the plurality of rectangular objects in the preview image by a controller, when respective distances between midpoints of the plurality of rectangular objects detected from the preview images are smaller than a predetermined threshold value;

capturing an image corresponding to the preview image, after detecting the plurality of rectangular objects and determining the main rectangular object, wherein capturing the image further comprises focusing on the main rectangular object determined by the controller; and generating a perspective-transformed image by performing perspective transform on the captured image using coordinate information corresponding to the main rectangular object.

* * * * *